United States Patent Office 3,536,692
Patented Oct. 27, 1970

3,536,692
PROCESS FOR THE PREPARATION OF HIGHLY CRYSTALLINE POLYMERS OF ALLENE COMPOUNDS
Seinosuke Otsuka, Kawanishi-shi, and Akira Nakamura, Moriguchi-shi, Japan, assignors to Japan Synthetic Rubber Co., Ltd., Tokyo, Japan, a corporation of Japan
No Drawing. Filed Apr. 23, 1968, Ser. No. 723,582
Claims priority, application Japan, Apr. 28, 1967, 42/27,175
Int. Cl. C08d $1/18$; C08f $1/34$, $1/58$
U.S. Cl. 260—94.3                            8 Claims

ABSTRACT OF THE DISCLOSURE

A process for the preparation of polymers of allene compounds having the polyvinylidene-type chemical structure at a high ratio by polymerizing an allene compound in an organic polar solvent using a catalyst represented by the formula $[RhX(L)_2]_2$, wherein X is a halogen and L is a member selected from the group consisting of CO and $C_2H_4$ in the presence or absence of a Lewis base having an element of the Group Vb of the Periodic Table.

---

This invention relates to a process for the preparation of highly crystalline polymers of allene compounds having the polyvinylidene-type polymer structure at a high ratio by polymerizing an allene compound. More specifically, this invention relates to a process for the preparation of polymers of allene compounds having the repeating unit represented by the formula:

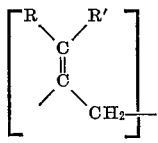

(I)

wherein R and R' are members selected from the group consisting of hydrogen atom, alkyl radicals, preferably alkyl radicals having from 1 to 4 carbon atoms and phenyl radicals, and R and R' may be the same or different, which comprises contacting an allene compound represented by the formula:

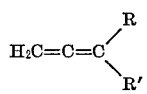

(II)

wherein R and R' have the same meanings as defined above, in an organic polar solvent with a catalyst comprising at least one compound represented by the formula:

$$[RhX(L)_2]_2 \qquad (III)$$

wherein X is a halogen and L is a member selected from the group consisting of CO and $C_2H_4$, in the presence or absence of a Lewis base selected from the group consisting of compounds of elements of the Group Vb of the Periodic Table.

It is known that allene gives some oligomers by heating [Zhur, Russ. Fiz. Khim. Absch., 4, 1357 (1913); J. Am. Chem. Soc., 5, 4540 (1930); Chem. Ber. 87, 1567 (1954); J. Am. Chem. Soc., 78, 109 (1956); and Tetrahedron Letters, No. 22, 1463 (1963)]. The structures of these substances are as follows:

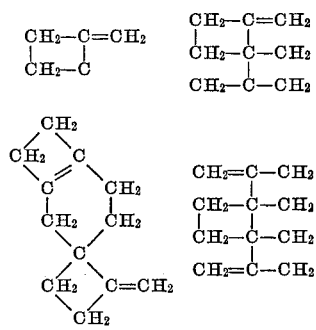

Further it is known that allene polymerizes catalytically to a high molecular weight polymer. For example, allene has been polymerized by Ziegler-type catalysts [J. Polymer Sci., AI, 655 (1963)]. However, the obtained polymers are not of regular structure but contain substantial amounts of vinyl radical, vinylidene radical and internal olefin unit, respectively.

Still further, allene is polymerized by cobalt carbonyl catalyst [J. Org. Chem., 21, 875 (1956)]. The reaction product, however, is a non-homogeneous solid. Most of the solid is brownish-yellow, and some black material is also present. The solid is not of regular structure and is insoluble in benzene.

These polymers of allene as mentioned above are not useful in any application.

We have found that 1,2-polyallene [compounds] can be produced by using as the catalyst $\pi$-complexes of nickel, and we proposed a process for the production of 1,2-polyallene [compounds] by using such $\pi$-complexes (Journal of the American Chemical Society, 187:131, July 5, 1965, pp. 3017–3018).

In accordance with said proposed process a colorless solid polyallene (ordinarily having a molecular weight from about 50,000 to about 150,000) which is easily soluble in a hydrocarbon solvent such as benzene, toluene and cyclohexane at room temperature but insoluble in a ketone such as methylethyl ketone and which has a melting point of from 61 to 62° C., can be prepared from allene in which both of R and R' of the said Formula II are hydrogen atoms; a polymethylallene which has a higher rubbery elasticity than the above polyallene can be prepared from methylallene in which one of R and R' of the Formula II is a hydrogen atom and the other is a methyl radical; and a solid polymer can be prepared from $\alpha,\alpha'$-dimethylallene in which both of R and R' of the Formula II are methyl radicals.

According to said proposal it has become possible to provide useful polymers of allene compounds. However, in the performance of this process unsaturated hydrocarbon impurities incorporated in the starting allene compound and impurities incorporated in the reaction solvent inhibit advance of the polymerization reaction more or less according to the kind or content of the impurities. Therefore, the process is considerably restricted by purity of the starting material and reaction solvent, and various operational cares must be taken of purification of the starting material and the solvent.

Further, the presence of water contained in the solvent tends to decompose the $\pi$-complexes of nickel and to lower or nullify their catalytic activities. Further, the said $\pi$-complexes of nickel are very sensitive to oxygen and tend to easily lose their activities in the presence of oxygen. Therefore, further cares and troublesome treatments are demanded in purification, regeneration and degasification of the solvent.

As a result of further study, we have developed a process for the production of highly crystalline polymers of allene compounds which are of improved regular structure, by which process the afore-mentioned technical disadvantages are overcome and according to which process a highly crystalline polyallene having a melting point of, for instance, 115–124° C. can be industrially advantageously produced.

The catalyst to be used in the process of this invention is soluble in an organic polar solvent and the solution of the catalyst in the organic polar solvent can be kept uniform even when the starting monomer is added thereto. Accordingly, the catalyst can exhibit a high polymerization activity and a good reaction reproducibility. Further, the polymerization activity of the catalyst of this invention is less prevented by impurities, contained in the starting monomer, of unsaturated hydrocarbons typified by acetylenes, as compared with the case of the previously proposed π-complexes of nickel. The above means that it is possible to use an industrially pure monomer as the starting allene compound monomer without purifying the starting monomer so highly as in the previously proposed process. Accordingly, the process of this invention is far advantageous in respect of operation, apparatus and costs for purification. Further, it is true of the impurities contained in the reaction solvent, and therefore the process of this invention is advantageous also in this point.

Ziegler-type catalysts or catalysts of organic π-complexes of nickel are decomposed by the presence of water and their catalytic activities are substantially lowered or nullified. Further, they are so sensitive to oxygen that their catalytic activities are often substantially lowered or nullified by the presence of oxygen. Therefore, as is broadly known, it is necessary to maintain such a strict reaction condition that water and oxygen are substantially absent not only in the monomer and solvent present in the polymerization system but also in its atmosphere. On the other hand, to our great surprise, the activity of the catalyst used in the process of this invention is not substantially influenced badly by the presence of a considerable amount of water, and a bad influence by oxygen on the catalytic activity is permitted to a greater extent as compared with the case of the previously proposed π-complexes of nickel. Therefore, it is possible to omit steps of purifying the reaction solvent such as steps of dehydration and degasification, and it is unnecessary to take care of maintaining the reaction system at such a condition that neither water nor oxygen is present.

Further, we are very surprised to know that when polymerization of an allene compound is performed by using said specific rhodium compound as the catalyst in an organic polar solvent a highly crystalline polymer of improved regular structure can be obtained with a high yield and that the catalyst exhibits an excellent catalytic activity in this polymerization.

Thus, the object of this invention is to provide a process for the preparation of polymers of allene compounds having a polyvinylidene-type polymer structure at a high ratio, which process is far more advantageous than the previously proposed process in respect of operating means, reaction apparatuses and manufacturing costs of the products.

Other objects and advantages of this invention will be made clear by the description hereinafter given.

The starting monomer of an allene compound to be polymerized in accordance with the process of this invention is represented by the above-mentioned Formula II wherein R is selected from the group consisting of hydrogen, phenyl radical, and alkyl radical, preferably alkyl radical having from 1 to 4 carbon atoms. The alkyl radicals can be either straight or branched alkyls, for example, methyl, ethyl, propyl, isopropyl, n-butyl, isobutyl and tert.-butyl. Furthermore it is to be understood that the alkyl radicals in the above-mentioned formula can be the same or they can be different. Examples of such monomer are allene, methylallene, ethylallene, propylallene, n-butylallene, dimethylallene, diethylallene and monophenylallene.

The catalyst to be used in the process of this invention comprises a compound represented by the afore-mentioned Formula III and it is particularly preferred to use the catalyst in combination with a Lewis base selected from the group consisting of compounds of elements of the Group Vb of the Periodic Table. Examples of the catalyst are

[RhCl(CO)$_2$]$_2$, [RhBr(CO)$_2$]$_2$, [RhI(CO)$_2$]$_2$,
[RhCl(C$_2$H$_4$)$_2$]$_2$, [RhBr(C$_2$H$_4$)$_2$]$_2$ and [RhI(C$_2$H$_4$)$_2$]$_2$. The use of the former three compounds is particularly recommended. Further, it is also recommended to use a compound in which X of the Formula III is chlorine or bromine.

As the Lewis base to be used in combination with the catalyst there are cited R″NC (wherein R″ is a member selected from the group consisting of alkyl radicals, preferably branched or straight alkyl radical having from 1 to 4 carbon atoms, and cycloalkyls preferably cyclohexyl); PPh$_3$ (wherein Ph stands for phenyl); P(OR‴)$_3$ (wherein R‴ is a member selected from the group consisting of alkyl radicals, preferably branched or straight alkyl radicals having from 1 to 4 carbon atoms, and phenyl radical); AsR‴$_3$R‴ is as defined above); SbR‴$_3$ (wherein R‴ is as defined above); and NR‴$_3$ (wherein R‴ is as defined above).

More specifically, as the Lewis base there can be cited cyclohexyl isonitrile, tert.-butyl isonitrile, triphenyl phosphine, triethyl phosphine, triphenyl phosphite, triethyl phosphite, triphenyl arsine, triphenyl antimonous, triphenyl amine, tert.-butyl amine, tri-n-butyl amine and dimethylphenyl amine and the like. Among them triphenyl phosphine, tert.-butyl amine, tert.-butyl isonitrile and cyclohexyl isonitrile are particularly preferred as the Lewis base.

These Lewis bases may form addition salts with the catalyst of the Formula III when they are used in combination. But, regardless of the formation of such salts, a combined use of the catalyst with such Lewis base always brings about good results. Therefore, in this invention the combined use of the catalyst with the Lewis base involves all the embodiments of the combined use of them both.

It is preferred to use the Lewis base at a ratio of 1 to 3 mols per mol of the catalyst of the Formula III. Particularly, it is recommended to use the Lewis base at a ratio of 2 mols per mol of the catalyst.

In the process of this invention the polymerization reaction is performed by contacting at least one of said allene compounds in an organic polar solvent with at least one of said catalysts, and preferably in the coexistence of said Lewis base. The reaction proceeds at room temperature. Although it is unnecessary to specially heat or cool the system, it is preferred to carry out the reaction at a temperature ranging from 0 to 100° C., more preferably from 30 to 80° C.

With reference to the reaction pressure, there is no specific limit. It is possible to carry out the reaction under reduced pressure if desired, but it is preferred to carry out the reaction under atmospheric or elevated pressure.

In this invention it is unnecessary to subject an organic polar solvent to a special degasification treatment, but it may be done, if desired. Further, it is also unnecessary to subject the solvent beforehand to a treatment for removing small amounts of water and other impurities incorporated in the solvent. Of course, such treatment may be done, if desired. As the organic polar solvents are cited alcohols such as methanol, ethanol, propanol, isopropanol, n-butanol, isobutanol and ethylene glycol; ethers such as diethyl ether, dimethoxy ethane, tetrahydrofuran and ethylene glycol monoalkylethers; halogenated hydrocarbons such as methylene dichloride and chloroform; mixtures of some of these compounds; and these compounds containing a considerable amount of water.

While in the processes using Ziegler-type catalysts and anion-type polymerization catalysts air or moisture fatally lowers the activity of the catalyst, in the process of this invention the catalyst is not badly influenced by air or moisture.

Thus, in the process of this invention a highly crystalline polymer of an allene compound having a regular structure can be obtained with high reproducibility regardless of impurities contained in the solvent, monomer and catalyst, and air or moisture present in the reaction system. Accordingly, it is quite unnecessary to remove impurities, air and moisture from the reaction system. Of course, removing treatments may be performed, if desired.

With the advance of the reaction, the polymer separates in a form of insoluble precipitates. Therefore, the intended polymer can be obtained by filtration, washing and drying. It may be possible to add an antioxidant to the system prior to said after-treatments, if necessary.

The amount used of the catalyst ranges from 0.05 to 10 mmols, preferably 0.1 to 5 mmols, per mol of the allene compound. It is possible to use the catalyst in an amount of less than 0.05 mmol, but in such case it is difficult for the catalyst to exhibit an industrially sufficient catalytic activity. Therefore, it is preferred to use the catalyst in an amount of not less than 0.05 mmol. In case the catalyst is used in an amount exceeding 10 mmols per mol of the allene compound, the reaction is not particularly made to proceed advantageously by using such a great amount of the catalyst. Such an amount as not exceeding 10 mmols of the catalyst per mol of the allene compound is industrially sufficient. However, in the process of this invention the amount used of the catalyst is not particularly critical.

The reaction time is ordinarily in an order of from 1 to 24 hours, preferably from 3 to 20 hours, but the reaction time is optionally varied according to the kind of the catalyst and the reaction conditions, and the said order of the reaction time is not indispensable for carrying out the process of this invention.

The process of this invention is industrially advantageous also in the respects where according to the process of this invention the resulting polymer separates from the solvent as precipitate; it is possible to heighten conversion ratio while preventing a rapid increase of viscosity of the system with an advance of the reaction; and whereas the catalyst is removed from the resulting polymer only by washing it with water, a solid end polymer is easily obtained.

The polymer of an allene compound to be produced in the process of this invention is a highly crystalline, 1,2-addition - type polymer consisting mainly of a regular structure represented by the formula

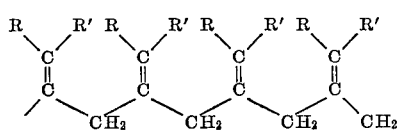

For instance, the pollyallene in which both R and R' are hydrogens, is a colorless, non-adhesive, highly crystalline polymer having a melting point of 115–124° C. This polymer is almost insoluble in methanol, ethanol, acetone and benzene at temperatures ranging from room temperature to their boiling points, but at temperatures exceeding 100° C. the polymer becomes soluble in an alkylaromatic hydrocarbon such as xylene and in case the solution is cooled to about room temperature, the polymer separates. Further, the polymer is stable in the air and is not easily oxidized even in a form of a solution. Infrared absorption spectra of the film prepared from said polyallene are as follows: strong $\nu$C—H at 3030–2950 cm.$^{-1}$; weak at 1790 cm.$^{-1}$; strong $\nu$C=C at 1615 cm.$^{-1}$; weak $\nu$—CH$_2$— at 1410 cm.$^{-1}$; weak at 1280 cm.$^{-1}$; weak at 1236 cm.$^{-1}$; weak at 1140 cm.$^{-1}$; weak at 980 cm.$^{-1}$; very strong $\nu$=CH$_2$ at 882 cm.$^{-1}$; shoulder absorption at 700 cm.$^{-1}$; and very strong at 690 cm.$^{-1}$. The infrared absorption spectra of the polymer are almost the same as those of the polyallene obtained by the previously proposed process using the catalyst of an organic $\pi$-complex of nickel, but in the polyallene of this invention there is observed no absorption spectrum at 1590 cm.$^{-1}$ which results from the structure

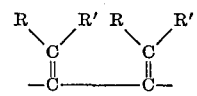

made by the head-to-head or tail-to-tail bonding of the allene compounds. Thus, it is evident that the polyallene of this invention has a more regular structure than that of the polyallene obtained by the process using the catalyst of an organic $\pi$-complex of nickel. This is also supported by the fact that the nuclear magnetic resonance spectrum of the polyallene of this invention shows only two keen peaks of $\tau$=5.15 (=CH$_2$) and $\tau$=7.30 (—CH$_2$—), and the absorption spectrum is far simpler than that of the polyallene obtained in the process using said nickel $\pi$-complex catalyst. Accordingly, it is evident that the polyallene of this invention has a polyvinylidene-type polymer structure at a high ratio. Further, in view of the fact that the polyallene of this invention has a higher melting point than that of the polyallene prepared by the previously proposed process using the catalyst of an organic $\pi$-complex of nickel, it is evident that the polyallene of this invention is more highly crystalline.

As the polymers of allene compounds prepared in accordance with the process of this invention have a very reactive vinylidene group at a high ratio, it is possible to convert them into various useful compounds by various reactions. For instance, polymers having functional groups can be easily prepared by introducing halogen, hydroxyl, alkoxy or ester groups to the polymers of allene compounds by means of addition of hydrogen halides, water, alcohols or organic acids to the polymers.

The several working embodiments of the process of this invention will be hereinafter explained by examples.

EXAMPLE 1

In a 50 ml. Schlenk's egg-plant type flask 15 ml. of 95% ethanol (containing 5% of water) and 18.5 mg. (0.048 mmol) of [RhCl(CO)$_2$]$_2$ were uniformly mixed together. The atmosphere of the vessel was replaced by nitrogen and then allene was slowly introduced into the vessel at a rate of 15–30 ml./min. while the temperature was raised to 60° C. After a lapse of time of 30 minutes, a white polymer began to separate. The reaction was continued over a period of succeeding 4.5 hours at temperature maintained between 60 and 70° C. A small amount of hydroquinone (antioxidant) was added to the reaction mixture, following which the precipitate was filtered in the air, washed with methanol and dried to obtain 0.35 g. of a bulky polymer having a melting point, measured by a polarizing microscope, of 122–124° C.

EXAMPLE 2

In the same manner as in Example 1, 19.4 mg. (0.05 mmol) of [Rh(CO)$_2$Cl]$_2$ and 26.2 mg. (0.1 mol) of triphenyl phosphine were mixed with 15 ml. of 99% of ethanol and the atmosphere of the vessel was replaced by nitrogen. Generation of a gas (CO) was observed and a yellow precipitate was formed. The solution had a yellow color. Allene was slowly introduced into said precipitate-containing solution and the temperature was raised to 50–60° C. As a result, a white polymer began to separate. The reaction was continued for 4.5 hours at temperatures maintained between 50 and 60° C. A small amount of hydroquinone was added to the reaction mixture, and thereafter the precipitate was filtered, washed and dried to obtain 2.3 g. of a polymer. The so obtained polymer was soluble in hot paraxylene but a part of the polymer was insoluble therein.

EXAMPLE 3

In the same manner as in Example 1, 12 mg. (0.025 mmol) of $[Rh(CO)_2Br]_2$ were dissolved in 15 ml. of 95% ethanol and the atmosphere of the vessel was replaced by nitrogen. Thereafter, allene was slowly introduced into the vessel. The temperature of the reaction mixture was raised and maintained at 50° C. One hour later, a polymer began to separate. After the said temperature had been maintained for succeeding 5 hours, the reaction system was cooled and allowed to stand still overnight. The separating precipitate was filtered, washed with ethanol and dried to obtain 0.53 g. of a polymer.

A brown semi-solid of a low polymer (0.08 g.) was obtained by evaporating the filtrate.

EXAMPLE 4

13 mg. of a high polymer were obtained by carrying out the reaction at 55° C. for 5 hours in the same manner as in Example 1 except using 18 mg. (0.046 mmol) of $[Rh(CO)_2Cl]_2$ as the catalyst and 15 ml. of ethylene glycol containing 5% by weight of water as the solvent.

EXAMPLE 5

174 mg. of a white high polymer were obtained by carrying out the reaction at 20° C. for 45 hours in the same manner as in Example 1 except using 16 mg. (0.04 mmol) of $[Rh(CO)_2Cl]_2$ as the catalyst and 15 ml. of methylene chloride containing 3% by weight of water as the solvent.

EXAMPLE 6

Under nitrogen atmosphere 10 mg. (0.026 mmol) of $[Rh(CO)_2Cl]_2$ and 12 mg. (0.046 mmol) of triphenyl phosphine were added into 95% ethanol, and 1 ml. of dimethyl allene was further added thereto. The temperature was raised and maintained at 45–50° C. for 40 hours, during which a faintly yellow polymer separated. The precipitate was filtered, washed with 95% ethanol and dried on calcium chloride to obtain 0.24 g. of a polymer. The so obtained polymer was highly crystalline. The crystal portion of the polymer had a melting point of 156–8° C., and an apparent melting point of the polymer was 148–150° C. From infrared absorption spectra, the structure of the polymer was considered to be as follows:

$$\left[\begin{array}{c} CH_3 \quad CH_3 \\ \diagdown \quad \diagup \\ C \\ \| \\ C \\ \diagup \quad \diagdown \\ \quad \quad CH_2 \end{array}\right]_n$$

From the filtrate there was obtained about 0.15 g. of a low polymer as a viscous oily product.

EXAMPLES 7–13

The Example 1 was repeated by changing the kinds of the monomer, the catalyst, the Lewis base, the solvent, and the reaction conditions as specified in the Table 1 below. The results are also shown in the Table 1 below.

TABLE 1

| Example No. | Monomer, amount used: g. | Catalyst, amount used: mmol. | Lewis base, amount used: mmol. | Solvent, amount used: ml. | Reaction temperature, °C. | Reaction time, hrs. | Products | | |
|---|---|---|---|---|---|---|---|---|---|
| | | | | | | | Highly crystalline polymer, g. | Melting point, °C. | Low polymer, g. |
| 7 | 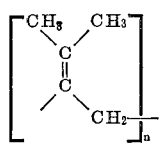 H₂C=C=C— (0.87) | [Rh(CO)₂Cl]₂, 0.03 | PPh₃, 0.06 | Ethanol, 15 | 50 | 3 | 0.4 | 120–130 | |
| 8 | H₂C=C=CH₂, 2.1 | [Rh(C₂H₄)₂Cl]₂, 0.1 | Tert.-butyl amine, 0.1 | do | 60 | 18 | 1.9 | 122–124 | |
| 9 | H₂C=C=CH₂, 2.1 | [Rh(C₂H₄)₂Cl]₂, 0.1 | Tri-n-butyl amine, 0.1 | do | 60 | 18 | 1.8 | 122–124 | |
| 10 | H₂C=C=CH₂, 2.1 | [Rh(C₂H₄)₂Cl]₂, 0.1 | Triphenyl arsine, 0.2 | Tetrahydrofuran, 15 | 60 | 18 | 1.1 | 122–124 | 0.08 |
| 11 | H₂C=C=CH₂, 2.1 | [Rh(C₂H₄)₂Cl]₂, 0.1 | Triphenyl phosphite, 0.1 | do | 60 | 4 | 1.0 | 122–124 | |
| 12 | H₂C=C=CH₂, 2.1 | [Rh(C₂H₄)₂Cl]₂, 0.1 | Cyclohexyl isonitrile, 0.2 | Ethanol, 15 | 60 | 4 | 2.1 | 122–124 | |
| 13 | H₂C=C=CH₂, 2.1 | [Rh(C₂H₄)₂Cl]₂, 0.1 | Tert.-butyl isonitrile, 0.2 | do | 60 | 4 | 2.1 | 122–124 | |

What we claim is:

1. A process for the preparation of polymers of allene compounds having the repeating unit represented by the formula

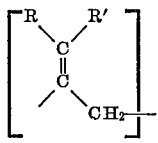  (I)

wherein R and R' are members selected from the group consisting of a hydrogen atom and alkyl and phenyl radicals, and R and R' may be the same or different, which comprises contacting an allene compound represented by the formula

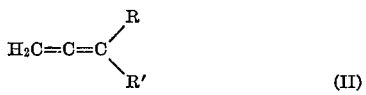  (II)

wherein R and R' have the same meanings as defined above, in an organic polar solvent selected from the group consisting of alcohols, ethers, and halogenated hydrocarbons with a 0.05 to 10 millimols per mol of allene compound of a catalyst consisting essentially of a compound represented by the formula $$[RhX(L)_2]_2 \quad (III)$$

wherein X is a member selected from chlorine, bromine and iodine and L is a member selected from the group consisting of CO and $C_2H_4$.

2. The process of claim 1 wherein X of the catalyst compound of the Formula III is selected from the group consisting of chlorine and bromine.

3. The process of claim 1 wherein said organic polar solvent is a member selected from the group consisting of ethanol, ethylene glycol, methylene dichloride and tetrahydrofuran.

4. A process for the preparation of polymers of allene compounds having the repeating unit represented by the formula

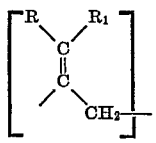  (I)

wherein R and R' are members selected from the group consisting of a hydrogen atom and alkyl and phenyl radicals, and R and R' may be the same or different, which comprises contacting an allene compound represented by the formula

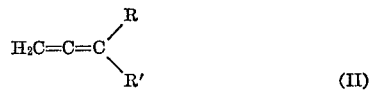  (II)

wherein R and R' have the same meanings as defined above, in an organic polar solvent selected from the group consisting of alcohols, ethers, and halogenated hydrocarbons with 0.05 to 10 millimols per mol of allene compound of a catalyst consisting essentially of a compound represented by the formula $$[RhX(L)_2]_2 \quad (III)$$

wherein X is a member selected from chlorine, bromine and iodine and L is a member selected from the group consisting of CO and $C_2H_4$, in the presence of 1 to 3 mols per mol of catalyst compound of Formula III of a Lewis base selected from R"NC, wherein R" is selected from alkyl and cycloalkyl radicals; $PPH_3$, wherein PH represents phenyl; $P(OR''')_3$; $AsR'''_3$; and $NR'''_3$, wherein R''' is selected from alkyl and phenyl radicals.

5. The process of claim 4 wherein said Lewis base is a member selected from the group consisting of triphenyl phosphine, triphenyl arsine and triphenyl amine.

6. The process of claim 4 wherein said Lewis base is a member selected from the group consisting of cyclohexyl isonitrile, tert.-butyl isonitrile, triphenyl phosphite, tert.-butyl amine and tri-n-butyl amine.

7. The process of claim 4 wherein X of the catalyst compound of the Formula III is selected from the group consisting of chlorine and bromine.

8. The process of claim 4 wherein said organic polar solvent is a member selected from the group consisting of ethanol, ethylene glycol, methylene dichloride and tetrahydrofuran.

References Cited

UNITED STATES PATENTS

| | | | |
|---|---|---|---|
| 3,405,112 | 10/1968 | Otsuka et al. | 260—94.3 |
| 3,442,883 | 5/1969 | Shier | 260—94.3 |

JOSEPH L. SCHOFER, Primary Examiner

W. F. HAMROCK, Assistant Examiner

U.S. Cl. X.R.

252—431, 472; 260—93.5